United States Patent [19]

Anderson

[11] 3,977,973
[45] Aug. 31, 1976

[54] FRY KETTLE WITH INTEGRAL CONTINUOUS FILTER

[76] Inventor: Lyle V. Anderson, 122 Carriage Drive, Pittsburgh, Pa. 15237

[22] Filed: Apr. 28, 1975

[21] Appl. No.: 572,016

[52] U.S. Cl. ............................ 210/167; 210/DIG. 8; 99/408
[51] Int. Cl.² .................... B01D 35/00; B01D 37/02
[58] Field of Search ........... 210/236, 314, 316, 346, 210/347, 167, DIG. 8, 75, 169, 195, 196, 168, 197, 193, 257, 455, 502, 503, 186, 175; 99/408; 426/417, 438

[56] References Cited
UNITED STATES PATENTS

| | | | |
|---|---|---|---|
| 1,565,661 | 12/1925 | Lomax | 210/DIG. 8 |
| 1,742,281 | 1/1930 | Rundlett | 210/167 |
| 2,002,826 | 5/1935 | Moran | 210/346 |
| 2,207,514 | 7/1940 | Haldeman | 210/167 |
| 2,438,739 | 3/1948 | Burruss | 210/169 |
| 2,696,800 | 12/1954 | Rork | 210/186 |
| 3,025,831 | 3/1962 | Berardi | 210/169 |
| 3,263,596 | 8/1966 | Thomas | 99/408 |
| 3,280,722 | 10/1956 | Rahauser | 210/DIG. 8 |
| 3,477,361 | 11/1969 | Bradshaw | 210/167 |
| 3,483,981 | 12/1969 | Gordon | 210/316 |
| 3,586,169 | 6/1971 | Hultquist | 210/186 |
| 3,610,133 | 10/1971 | Mies | 210/DIG. 8 |
| 3,667,374 | 6/1972 | Holmes | 99/408 |
| 3,733,202 | 5/1972 | Marmor | 210/DIG. 8 |
| 3,735,872 | 5/1973 | Anderson | 210/167 |
| 3,754,652 | 8/1973 | Franklin | 210/DIG. 8 |
| 3,839,951 | 10/1974 | Palmason | 99/408 |
| 3,870,636 | 3/1975 | Schettler | 210/236 |
| 3,894,482 | 7/1975 | Murphy | 99/408 |

FOREIGN PATENTS OR APPLICATIONS 539,208  11/1931  Germany ......................... 210/169

*Primary Examiner*—Charles N. Hart
*Assistant Examiner*—Ernest G. Therkorn
*Attorney, Agent, or Firm*—Brown, Murray, Flick & Peckham

[57] ABSTRACT

A fry kettle is divided by an internal crosswall to define an oil storage compartment having a heating element submerged in the oil for cooking foods. Crumbs and other contaminants are separated from the cooking oil by continuously drawing off a small portion of the oil from the storage compartment through an opening in the crosswall into an integral filter compartment where the oil passes through openings into a crumb catcher which is carried by a removable frame adjacent the internal crosswall and above a manually-operated flow control valve. The valve includes a valve stem projecting to the top of the kettle where it can be positioned to terminate the flow of oil through a passageway in a subfloor that is spaced above the bottom wall of a filter compartment. The floor of the filter compartment defines a drain port that is surrounded by a frame used to carry two spaced-apart filter assemblies each comprising a frame to support a wire mesh and filter cloth adapted to entrain a filtering powder compound to clean and purify the cooking oil. The purified oil from the filters is returned by a pump in a continuously circulating manner into the storage compartment.

18 Claims, 4 Drawing Figures

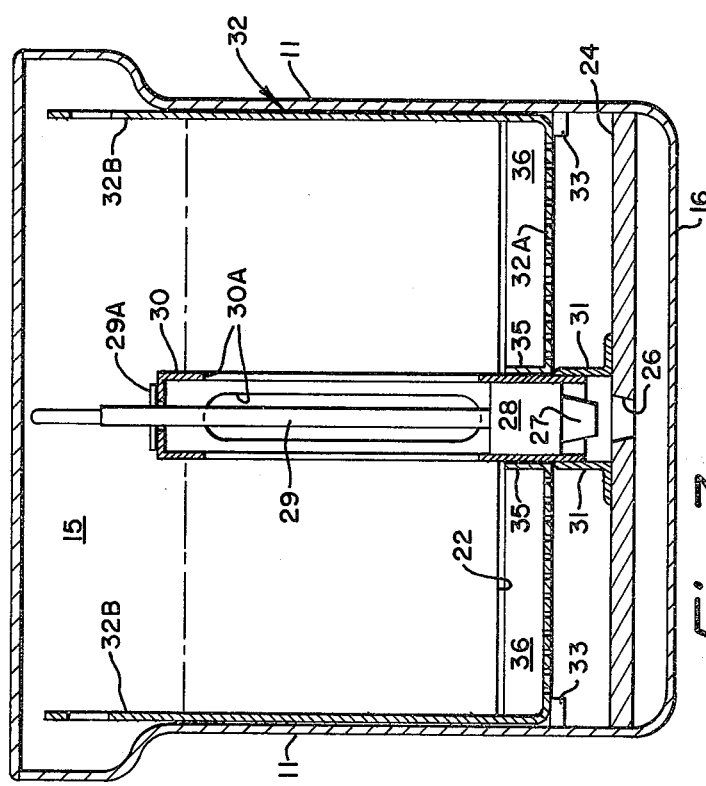
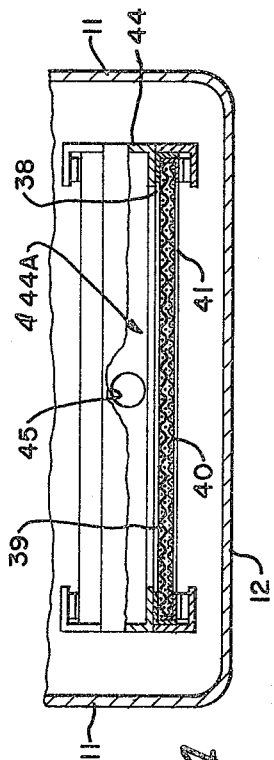
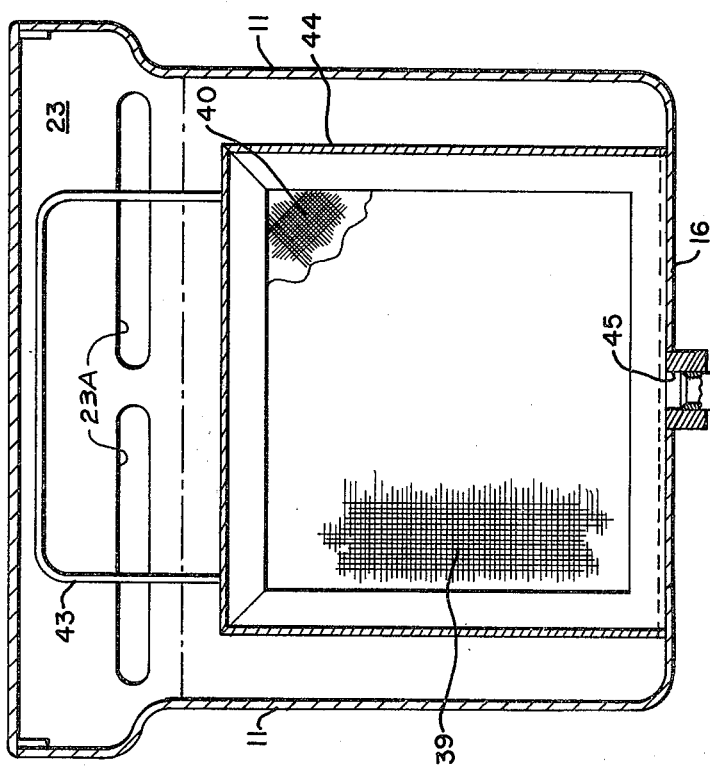
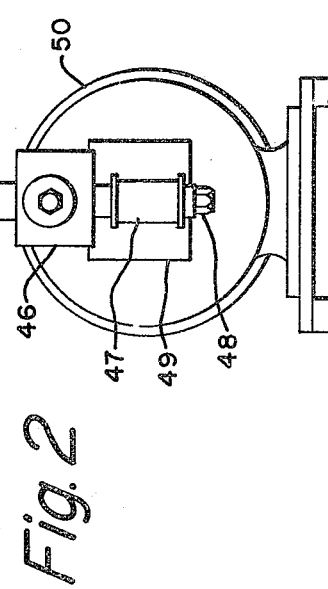

FRY KETTLE WITH INTEGRAL CONTINUOUS FILTER

BACKGROUND OF THE INVENTION

This invention relates to a container such as a fry kettle having an integral filter system for the essential continuous filtering of the frying medium. More particularly, the present invention relates to an improved construction and relationship of parts for a fry kettle to carry out filtering of the frying medium in such a manner that personnel using the fry kettle are not subjected to severe potentially hazardous working conditions particularly incident to the changing or replacement of the filter and associated parts.

It is generally known by those skilled in the art that when foods are cooked by deep-fat frying, more fat or oil is absorbed by the foods being cooked when the cooking medium contains destructive contaminants such as moisture, free-fatty acids and burnt food particles. Not only are the cooked foods less desirable to the consumer but also there is the need to almost continuously add make-up amounts of cooking oil or fat. This increases the cost of the cooking medium which is further increased by the need to discard the cooking medium because the entrained contaminants have rendered it unfit for further use. In the past, a single charge of frying fat for a deep-fry kettle had to be replaced at least every other day even when attempts were made to strain out at least some of the contaminants from the cooking oil.

One known attempt in the art to provide a filter for the fat used in deep frying is disclosed in U.S. Pat. No. 3,147,220 wherein there is disclosed a separate container used to house a filter. The container is connected by a pipe with an opening in the bottom of a deep-fry kettle. The pipe includes a shutoff valve to terminate the flow of hot fat when a sealed cover is unlatched from the filter container. A filter bag is placed in a basket within the filter which also includes a crumb catcher from where the hot cooking oil flows to the inside surface of the filter. The filtered oil is drawn out from the container through a discharge pipe that is coupled with a pump. Because the filter and the pump are isolated from the fry kettle, the return line for the filtered cooking fat must be heated to maintain the fat liquefied. While this system will achieve desirable filtering of the fat used in deep-fry kettles, it nevertheless suffers from the acute disadvantage that operating personnel are subject to acute safety hazards. In this respect, it must be remembered that cooking oil in fry kettles is usually heated to a temperature between 350°F and 400°F. The filter must be disassembled, cleaned and reassembled while total reliance must be made on the integrity of the shutoff valve both that it will not fail and that it will completely terminate the flow of hot oil from the fry kettle. Should the valve fail to function in its intended manner, then the hot oil will drip and flow into the filter container. Thus, personnel are endangered when disassembling the filter container. There is also the imminent danger that the lines to conduct the hot cooking fat may rupture or the fry kettle itself may be jarred or upset during disassembling and reassembling of the filter container.

SUMMARY OF THE INVENTION

It is an object of the present invention to provide a fry kettle and the like with an improved filter system which is constructed as an integral part of the fry kettle and designed for operation and servicing with the utmost safety to personnel.

It is a further object of the present invention to provide a fry kettle with a continuously operative filter system having a simplified construction and relationship of parts for cleaning and reassembling the filter in a safe and efficient manner.

It is another object of the present invention to provide an internal partition to divide the fry kettle or the like into a frying area and a filtering area with a removable cover such that the filtering area contains both a crumb catcher and an improved filter system utilizing a filter compound for high efficient filtering of contaminants from cooking medium passed from the frying area into the filtering area, and thereafter circulated back into the frying area.

More specifically, according to the present invention there is provided a container with an integral filter system comprising the combination of a kettle including walls joined with an internal crosswall having at least one passageway to conduct a fluid medium from a storage compartment lying at one side of the crosswall into a filter compartment lying at the other side of the crosswall, the filter compartment having a drain port in the floor of the kettle for discharging the fluid medium after filtering thereof and the storage compartment having a charge port in the wall of the kettle to receive the fluid medium after filtering thereof, porous filter means adapted to entrain a filter powder compound when immersed in the fluid medium in the filter compartment to clean and purify the fluid medium, a removable support frame assembly carrying the porous filter means in a cooperative relation with the walls of the filter compartment so as to pass only the filtered liquid medium into the drain port, and pump means coupled by a conduit with the drain port and the charge port for feeding the filtered medium into the storage compartment.

In the preferred form of the present invention, the aforesaid filter compartment in the kettle includes an additional wall spaced from the internal crosswall so as to define a liquid-receiving chamber adapted to support a crumb catcher therein above the floor wall where there is additionally included a solid sub-floor having an aperture therein to receive the stopper connected to a valve stem for controlling the flow of frying medium from the storage compartment of the kettle. The preferred construction of the kettle according to the present invention includes the provision of a return line extending along the external face surface of the floor of the kettle so that the frying medium conducted thereby continually receives heat from the contained liquid in the kettle. The liquid in the kettle is heated by a submerged heating element.

These features and advantages of the present invention as well as others will be more readily understood when the following description is read in light of the accompanying drawings, in which:

FIG. 2 is a sectional view taken along line II—II of FIG. 1;

FIG. 3 is a sectional view taken along line III—III of FIG. 1; and

FIG. 4 is a sectional view taken along line IV—IV of FIG. 1.

Figure 1:
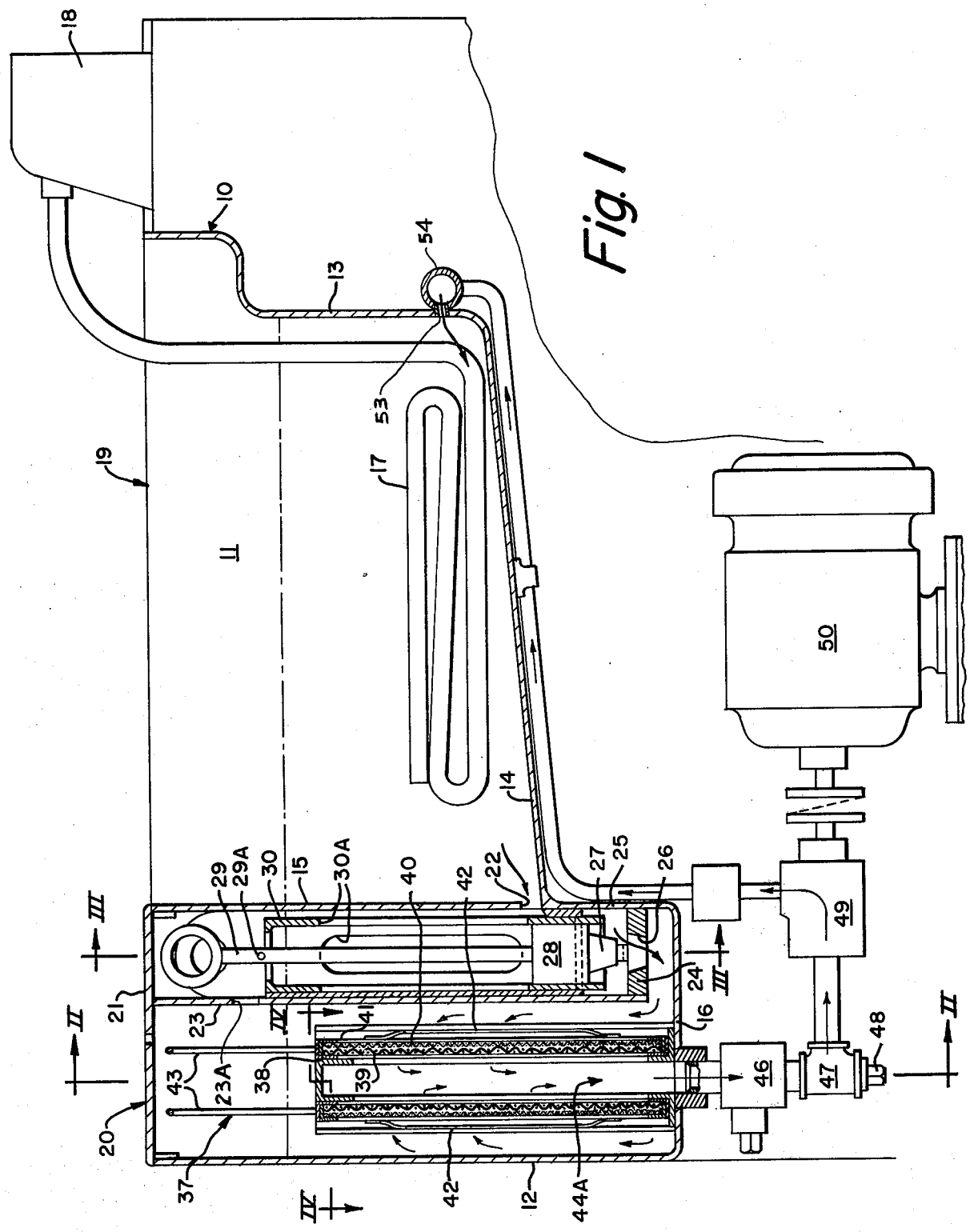
FIG. 1 is an elevational view, in section, of a fry kettle embodying the features of the present invention.

In FIGS. 1–3, there is shown a deep-fat fryer which includes a container in the form of a fry kettle 10 having upstanding side walls 11 and front and back walls 12 and 13, respectively. The kettle includes a floor wall that is shaped to form a sloping bottom wall 14 in a cooking and oil storage area which extends from the back wall 13 of the kettle to an internal crosswall 15. A bottom wall 16 extends horizontally between the internal crosswall 15 and the front wall 12 while spaced below the floor wall 14. The area of the kettle bounded by walls 11, 13 and 15 defines a storage area 19 for cooking oil or the like wherein deep-frying operations are performed and wherein a heating element 17 is submerged in the contained cooking oil. The submerged heating element 17 is pivotally supported by an external housing 18 which also includes contactors for supplying electrical power to the heating element. Gas-fired heating tubes may be employed in place of the heating element 17.

The internal crosswall 15 bounds on one of its faces a storage compartment 19 for deep-fat frying operations which is dimensioned to receive a wire basket or the like in the usual manner to contain the food during the cooking operation. At the opposite side of the internal crosswall 15, there is defined a filter compartment 20. The filter compartment is bounded by the internal crosswall 15, front wall 12 and a portion of the side wall 11. The filter compartment is normally closed by a removable lid 21. As will be described in greater detail hereinafter, the hot cooking oil or fat from the storage compartment 19 usually flows continuously into the filter compartment through a passageway 22 in the internal crosswall 15. The passageway 22 is actually a slot formed between the bottom edge of crosswall 15 and floor wall 14. The slot 22 extends across the entire width of the fry kettle. The filter compartment 20 is divided into two component parts by a crosswall 23 that extends between the side walls 11 and supports one longitudinal edge of a subfloor 24 that is spaced above the floor 16 and joined along its opposite edge with a short vertical wall section 25. The wall section 25 extends between and is coextensive with the bottom wall 16 and the sloping bottom wall 14. The subfloor 24 includes at the approximate center thereof, a tapered annular opening 26 that is selectively closed to block the flow of oil by a valve plug 27 that is carried by a valve stem 28 that is, in turn, coupled with a control rod 29 that projects up to the undersurface of the lid 21. As shown in FIGS. 1 and 3, a valve support frame 30 extends between crosswalls 15 and 23 and supported by angle bars 31 on the subfloor 24. At an elevation above the passageway 22, the support frame 30 includes elongated slots 30A in its side walls whereby oil passing through the passageway 22 is maintained at a uniform level within the space between crosswalls 15 and 23. A stop pin 29A in the top of the valve stem 29 engages the support frame 30. By rotating the valve stem 29, the pin 29A will assume a position to pass through a slot in the top of frame 30 to allow the valve to move downwardly into a closed position.

A crumb catcher 32 has a perforated bottom wall 32A and vertically-extending side arms 32B projecting upwardly to the undersurface of the lid 21 so that after the lid is removed, the crumb catcher can be lifted vertically from support stops 33 for cleaning. The support stops 33 are secured to the side walls 11 to hold the perforated bottom wall of the crumb catcher in a spaced relation above the subfloor 24. The crumb catcher includes a central opening dimensioned to pass freely over the frame 30. This opening is surrounded by short vertical walls 35. Short walls 36 extend between the vertical walls 35 and the side arms 32B to form a shallow pocket to contain accumulated particles and the like separated from the oil passing through the perforated bottom wall of the crumb catcher. The strained oil flows along the upper surface of the subfloor 24 beyond the angle bars 31 and through the annular opening 26 when the valve is in its raised position as shown in FIGS. 1 and 3. The oil then flows out from under the subfloor for passage through a filter 37.

As shown in FIGS. 1, 2 and 4, the filter 37 is made up of two filter assemblies each consisting of a rectangular frame 38 enclosing a window-like opening over which a wire screen 39 is supported by the frame. The wire screen supports a filter cloth 40 which is held in place by a smaller frame 41 dimensioned to pass into frame 38 in a nested relation. The outer vertical sides of frame 41 carry leaf springs 42 that urge the frame 41 into nested relation with frame 39 when the filter is inserted using handles 43 into guide rails of a filter support housing 44. The springs 42 insure a liquid-tight seal between the filters and the housing 44. The housing is supported only along its lower surface by the bottom wall 16. The housing 44 is spaced from side walls 11 and front wall 12 so that the flow of oil rising from beneath the subfloor 24 is constrained to pass through one of the filters carried at opposite sides of the housing 44. To enhance the efficiency of the filtering system of the present invention, it is preferred to introduce a powdered filter compound which is carried initially by the oil into the filter cloth and entrained therein to thereby reduce the openings in the filter cloth for a greater degree of cleansing and purification of the oil which, after passing through the filter, flows downwardly within an internal chamber 44A for passage through a drain port 45 in the floor 16. The drain port is coupled by a conduit to a drain control valve 46 that is, in turn, connected to a Tee 47 having a drain plug 48 and a feed line to deliver the filtered cooking oil to a pump 49 which develops a subatmospheric pressure within chamber 44A. A flexible coupling forming a thermal barrier is used to couple the pump to a motor 50.

An output line 51 from the pump includes a maintenance shutoff valve 52. The output line, as clearly shown in FIG. 1, extends in contact with the outer face surface of the bottom wall 14 in a manner such that the heat generated in the fry kettle is utilized to keep the oil in the return line at an elevated temperature sufficient to allow free-flowing of the oil through a plurality of charge ports 53 in a header 54. The charge ports are located at spaced intervals across the back wall 13 to facilitate the movement of crumbs through the passageway 22.

It will, of course, be understood that during normal use of the fry kettle according to the present invention, the pump is continuously operating to feed filtered oil withdrawn from the filter compartment into the storage compartment via header 54. When it is desired to change the filters, the lid 21 is removed to expose the top of the filter compartment. The stopper 27 of valve 28 is moved into a closed position by seating it within the conical opening 26. The pump is allowed to continue operation until all the oil is removed from the filter compartment. After this occurs, the filters are lifted from the housing 44 and the filter compartment.

Each filter is disassembled so that the filter cloth can be replaced and then the filters are reassembled. The crumb catcher 32 is then removed from the filter compartment by lifting the arms 32B vertically. Overflow openings 23A in crosswall 23 prevent an abnormally high oil level above the crumb catcher. The crumb catcher can be removed, cleaned and replaced at any time during the operation of the fry kettle independently of whether the valve 28 is open or closed. The reassembled filters are then inserted into the housing 44 and a charge of filter media is placed in the filter compartment. After the filter compound is charged into the filter compartment, the valve 28 is opened and lid 21 is replaced. Valve 46 is then opened and the pump 49 is again energized to return the filtered oil received from the filter assemblies into the storage compartment 19. The filter powder compound becomes entrained in the filter cloth as the oil level rises in the filter compartment.

To drain the fry kettle completely, it is first necessary to remove the lid 21. Valve 28 is then closed while the pump 49 continues to run. The crumb catcher is then removed and after the filter chamber is emptied, then the filters are removed. Valve 46 is then closed and plug 48 is removed after a container has been placed under the Tee 47. Valves 46 and 28 are then opened to drain the spent oil from the fry kettle. When it is desired to fill the kettle with fresh oil or cooking fat, then the valves 28 and 46 are closed after which the plug 48 is replaced. The filter assemblies are then inserted into the filter compartment and the crumb catcher is replaced. The kettle is then filled with fresh oil and a charge of filter powder is introduced into the filter compartment following which the lid 21 is replaced and the valves 28 and 46 are opened. The motor 50 is then energized to return the filtered oil to the storage compartment 19.

The use of a kettle with an integral filter system according to the present invention will enable the use of the same cooking fat or oil for a period of time as long as 4–6 weeks whereas with conventional fry kettles, the cooking oil should be replaced at least every other day. This materially reduces the cost of the cooking oil and the filter system maintains the cooking oil through its period of use in a clean and purified state by the periodic cleaning of the crumb catcher and replacement of the filter cloth and filter powder compound used in the filter compartment.

Although the invention has been shown in connection with a certain specific embodiment, it will be readily apparent to those skilled in the art that various changes in form and arrangements of parts may be made to suit requirements without departing from the spirit and scope of the invention.

I claim as my invention:

1. A deep fat frying container with an integral filter system comprising the combination of:
    a kettle including side walls joined with a vertically-arranged internal crosswall having at least one passageway at the floor of the kettle to conduct a fluid medium from a storage compartment lying at one side of said crosswall into a filter compartment lying at the other side of said crosswall, the filter compartment having a drain port in the wall of said kettle for discharging fluid medium after cleaning and purifying and the storage compartment having a charge port in the wall of the kettle to receive the fluid medium after cleaning and purifying,
    porous filter means including a filter cloth adapted to entrain a filter powder compound when immersed into the fluid medium in said filter compartment to clean and purify the fluid medium passed therethrough, said filter compartment being an integral part of said kettle but divided by said internal crosswall from said storage compartment in a manner to contain the fluid medium for admixing with a charge of said filter compound incident to entrainment in said filter cloth,
    a support frame carrying said porous filter means in said filter compartment in a manner so as to pass only cleaned and purified liquid medium into said drain port, and
    pump means coupled by conduit means with said drain port and said charge port for feeding the cleaned and purified fluid medium into said storage compartment.

2. A container according to claim 1 further comprising a wire mesh screen carried by said support frame for supporting said porous filter means.

3. A container according to claim 2 wherein said support frame includes two rectangular frames each having a support surface to carry the mesh screen, and housing means carrying said rectangular frames in a uniformly, spaced-apart relation at opposite sides of said drain port.

4. A container according to claim 3 wherein said housing means includes guide tracks to support said rectangular frames in a spaced-apart relation, and resilient means to urge said frames into a liquid-tight relation with said housing means.

5. A container according to claim 1 further comprising valve means disposed in said kettle to control the flow of fluid medium from the passageway in said internal crosswall.

6. A container according to claim 1 further comprising a housing having an internal chamber communicating with the drain port in the wall of said kettle, and rails extending from said housing for carrying said support frame in a manner such that said porous filter means is in a fluid-transmitting relation with said internal chamber.

7. A container according to claim 1 further comprising a crumb catcher having perforated openings in a wall lying below the passageway in said internal wall for straining the liquid medium passing therethrough, and a support wall extending into said filter compartment in a generally-spaced parallel relation with said internal wall to form a fluid compartment for the fluid medium above said crumb catcher.

8. A container according to claim 7 further comprising stop means carried by said kettle to support said crumb catcher at a spaced position above the floor wall of the said filter compartment, and valve means operatively disposed in said filter compartment below said stop means to terminate the flow of liquid medium passing from said crumb catcher to said porous filter means.

9. A container according to claim 8 wherein said valve means includes a subfloor plate spaced above the floor of said filter compartment and below said stop means, said subfloor plate extending between opposed side walls of the filter compartment and extending between said internal wall and said internal crosswall, said subfloor plate having a fluid-conducting opening therethrough, and a stem including a valve plug for positioning said valve plug into a seating relation with the opening in said subfloor plate.

10. A container according to claim 1 wherein said conduit means coupled to said pump means extends along the outer bottom surface of said kettle in a heat-transferring relation to heat the liquid medium passed through said conduit means.

11. A container according to claim 1 wherein said kettle includes a floor wall extending in a downwardly-sloping manner from the side wall having said charge port therein toward said internal crosswall to facilitate movement of crumbs and similar particles entrained in the fluid medium along the floor wall for passage into said filter compartment.

12. A deep-fat fryer with an integral filter system comprising the combination of:
 a kettle including side walls joined with a vertically-arranged internal crosswall having at least one passageway at the floor of the kettle to conduct a fluid medium from a cooking compartment lying at one side of said crosswall into a filter compartment lying at the other side of said crosswall, the filter compartment having a drain port in the wall of said kettle for discharging fluid medium after filtering thereof and the cooking compartment having a charge port in the wall of the kettle to receive the fluid medium after filtering thereof,
 a vertical wall dividing said filter compartment into a first and second interconnected filter compartment parts lying at opposite sides of said vertical wall within said kettle,
 said first filter compartment containing a crumb catcher having a wall with perforated openings extending between said internal crosswall and said vertical wall dividing said filter compartment,
 said second filter compartment containing a porous filter means including a filter cloth to entrain a filter powder compound when admixed with the fluid medium to clean and purify the fluid medium passed thereto from the first filter compartment part,
 a support frame carrying said porous filter means within the second filter compartment part in a manner to pass only cleaned and purified liquid medium into said drain port, and
 pump means coupled by conduit means with said drain port and said charge port for feeding the cleaned and purified fluid medium into said storage compartment.

13. The deep-fat fryer according to claim 12 further comprising a wire mesh screen carried by support frame for supporting said filter cloth within said second filter compartment part.

14. The deep-fat fryer according to claim 13 wherein said support frame includes two rectangular frames each having a support surface to carry the mesh screen and filter cloth, and housing means carrying said rectangular frames in a uniformly, spaced-apart relation at opposite sides of said drain port.

15. The deep-fat fryer according to claim 14 wherein said housing means includes guide tracks to support said rectangular frames in a spaced-apart relation, and resilient means to urge said frames into a liquid-tight relation with said housing means.

16. The deep-fat fryer according to claim 12 further comprising valve means disposed within said first filter compartment part in said kettle to control the flow of fluid medium from the passageway in said internal crosswall into said second filter compartment part.

17. The deep-fat fryer according to claim 16 wherein said valve means includes a subfloor plate spaced above the floor of said kettle and below the opening in said internal crosswall, said subfloor plate extending between opposed side walls of said kettle within the filter compartment and extending between said vertical wall and said internal crosswall, said subfloor plate having a fluid-conducting opening therethrough, and a stem including a valve plug for positioning said valve plug into a seating relation with the opening in said subfloor plate.

18. The deep-fat fryer according to claim 12 wherein said kettle includes a floor wall sloped from a back wall toward said internal crosswall where a horizontal elongated slot is formed therebetween defining said passageway, said deep-fat fryer further including a header extending along said back wall, said header having a plurality of openings communicating with said cooking compartment for conducting the cleaned and purified fluid medium delivered thereto from said pump means.

* * * * *